(12) United States Patent
French et al.

(10) Patent No.: US 8,909,214 B2
(45) Date of Patent: *Dec. 9, 2014

(54) PERFORMANCE MANAGEMENT FOR A TELECOMMUNICATION NETWORK

(75) Inventors: Paul B. French, Dublin Pike (IE); Boris Ilijev, Douglas (IE); Mark J. Lucas, Ballintemple (IE); Niall J. Lucey, Carrigadrohid (IE); Fred Raguillat, Dunboyne (IE)

(73) Assignee: International Business Machines Corporation, Armonk, NY (US)

( * ) Notice: Subject to any disclaimer, the term of this patent is extended or adjusted under 35 U.S.C. 154(b) by 104 days.

This patent is subject to a terminal disclaimer.

(21) Appl. No.: 12/868,251

(22) Filed: Aug. 25, 2010

(65) Prior Publication Data
US 2011/0151862 A1 Jun. 23, 2011

(30) Foreign Application Priority Data
Dec. 18, 2009 (EP) .................................. 09179961

(51) Int. Cl.
*H04W 24/00* (2009.01)
*H04W 24/08* (2009.01)
*H04W 84/04* (2009.01)
*H04W 24/04* (2009.01)

(52) U.S. Cl.
CPC ............ *H04W 24/08* (2013.01); *H04W 84/045* (2013.01); *H04W 24/04* (2013.01)
USPC ......... 455/424; 455/418; 455/452.1; 702/184

(58) Field of Classification Search
CPC .... H04W 24/04; H04W 24/08; H04W 84/045
USPC .......... 455/424; 370/241, 242, 243, 244, 245, 370/246, 247, 248, 249, 250, 251, 252, 253
See application file for complete search history.

(56) References Cited

U.S. PATENT DOCUMENTS

| | | |
|---|---|---|
| 2003/0048748 A1 | 3/2003 | Semaan et al. |
| 2007/0054662 A1* | 3/2007 | Dillinger et al. ............. 455/423 |
| 2007/0100585 A1* | 5/2007 | Dulberg et al. ............... 702/184 |
| 2007/0283194 A1* | 12/2007 | Villella et al. .................. 714/57 |
| 2009/0003219 A1 | 1/2009 | Beacham et al. |
| 2009/0042536 A1 | 2/2009 | Bernard et al. |

(Continued)

OTHER PUBLICATIONS

U.S. Appl. No. 13/457,007 Office Action, Dec. 7, 2012, 16 pages.

(Continued)

*Primary Examiner* — Kashif Siddiqui
(74) *Attorney, Agent, or Firm* — DeLizio Gilliam, PLLC

(57) ABSTRACT

A computer program product and apparatus for use with a performance management system linked to a telecommunication network. The computer program product includes a storage medium with program code configured to receive a problem report from a femtocell of a plurality of femtocells communicatively coupled to the telecommunication network. The femtocell is configured to provide communications from at least one mobile device to the telecommunication network through a broadband connection. The problem report identifies a fault being exhibited by a femtocell and a performance parameter identifying a degradation in the performance of the femtocell. The program code is configured to analyze the performance parameter for determining a corrective action to be performed in an environment linked to the femtocell. The program code is configured to perform the corrective action in the environment linked to the femtocell.

19 Claims, 5 Drawing Sheets

(56) References Cited

U.S. PATENT DOCUMENTS

2009/0070379 A1    3/2009   Rappaport et al.
2011/0009105 A1*   1/2011   Lee et al. .................... 455/418
2012/0208530 A1    8/2012   French et al.

OTHER PUBLICATIONS

U.S. Appl. No. 13/457,007 Office Action, Jun. 22, 2012, 14 pages.
U.S. Appl. No. 13/457,007 Office Action, Aug. 2, 2013, 15 Pages.

* cited by examiner

PERFORMANCE MANAGEMENT FOR A TELECOMMUNICATION NETWORK

RELATED APPLICATIONS

This Application claims priority benefit of European Patent Application No. 09179961.9, titled "Performance Management for a Telecommunication Network", having a priority date of Dec. 18, 2009.

BACKGROUND

Embodiments relate to the field of performance management systems. In particular, embodiments relate to a method and apparatus for collecting performance management data from a plurality of femtocells in a telecommunications network.

Telecommunication companies are now introducing the concept of femtocells which can be installed in a subscriber's home. A femtocell is a small cellular base station which is typically, designed for use in residential premises or for small business. A femtocell connects to a service provider's telecommunication network via a broadband connection. Currently it is possible to connect two to four active mobile phones in a residential setting. A femtocell allows service providers to extend service coverage in indoor environments, especially where access would otherwise be limited or unavailable.

The introduction of femtocells into a 3G mobile networks will vastly increase the number of femtocells to be managed. The Operations, Administrations and Maintenance (OAM) approach that is currently being studied by Third Generation Partnership Program (3GPP) indicates that continuous supervision of a home femtocell is not feasible due to the high number of femtocells that are expected to be deployed in residential and non-residential premises. This implies that a continuous OAM connection from a femtocell to the service provider's operation system will not be supported. Therefore, there will be no OAM mechanism, for the mobile service provider to be notified of problems that occur in the home femtocell.

SUMMARY

Viewed from a first aspect, some example embodiments provide a computer program product and an apparatus configured to perform operations for use with a performance management system linked to a telecommunication network. In some example embodiments, operations include receiving a problem report from a femtocell, wherein the problem report identifies a fault being exhibited by a femtocell and a performance and event parameter identifying a degradation in the performance of the femtocell. The operations also include analyzing the performance and event parameter for determining a diagnostic action to be performed in an environment linked to the femtocell.

Some example embodiments provide operations wherein a plurality of problem reports are received from a plurality of femtocells. Each received problem report can comprise data regarding a performance and event parameter which details degradation in operating performance parameters exhibited by the femtocell.

Some example embodiments provide operations comprising analyzing each of the received problem reports and determining from which of the plurality of femtocells to collect additional data. Some example embodiments provide operations further comprising analyzing the plurality of received additional data and determining a corrective action to be communicated to an identified femtocell.

Some example embodiments provide operations comprising identifying a conflict between two or more performance parameters from the received problem reports and resolving the conflict by determining one or more corrective actions to be taken.

Some example embodiments provide operations comprising determining from the received additional data from one or more femtocells, a geographical location of each of the one or more femtocells and determining if a femtocell in a neighbouring geographical location is causing a degradation in operating performance parameters to a femtocell in a nearby geographical location and calculating new performance parameters to resolve the degradation in operating performance parameters.

Some example embodiments provide operations comprising analyzing each of the received problem reports to determine which of the plurality of femtocells linked to a received problem report are to be requested to transmit additional performance data. Some example embodiments provide operations comprising selectively ranking a determined severity of the problem report in order to communicate with one or more of the plurality of femtocells on a priority basis. Some example embodiments provide operations wherein the received problem report comprises information pertaining to one or more diagnostic actions undertaken by the femtocell.

Viewed from a second aspect, some example embodiments provide a computer program product configured to perform operations for use with a performance management system linked to a telecommunication network. The operations comprise comprises a collection component for receiving a problem report from a femtocell, wherein the problem report identifies a fault being exhibited by a femtocell and a performance and event parameter identifying a degradation in the performance of the femtocell; and an analysis component for analysing the performance and event parameter for determining a diagnostic action to be performed in an environment linked to the femtocell.

Viewed from a third aspect, some example embodiments provide a performance management apparatus operable for use with a performance management system linked to a telecommunication network. The apparatus comprises a collection component for receiving a problem report from a femtocell, wherein the problem report identifies a fault being exhibited by a femtocell and a performance and event parameter identifying a degradation in the performance of the femtocell. The apparatus comprises an analysis component for analysing the performance and event parameter for determining a diagnostic action to be performed in an environment linked to the femtocell.

Viewed from a fourth aspect, some example embodiments provide a performance management apparatus operable for use with a femtocell operating within a telecommunication network. The apparatus comprises a collection component for collecting performance and event data linked to the femtocell's operating environment. The apparatus comprises an analysis component for analysing the collected performance and event data to determine a degradation of the operating performance of the femtocell. The apparatus comprises a diagnostic component for determining a diagnostic action to be performed by the femtocell in order to improve the femtocell's operating performance. The apparatus also comprises an analysis component for generating a problem report for transmitting to a performance management system operating in the telecommunication network, in response to not being able to improve the femtocell's operating performance.

BRIEF DESCRIPTION OF THE DRAWINGS

Embodiments of the invention will now be described, by means of example only, with reference to the accompanying drawings in which.

DESCRIPTION OF EMBODIMENT(S)

Figure 1:
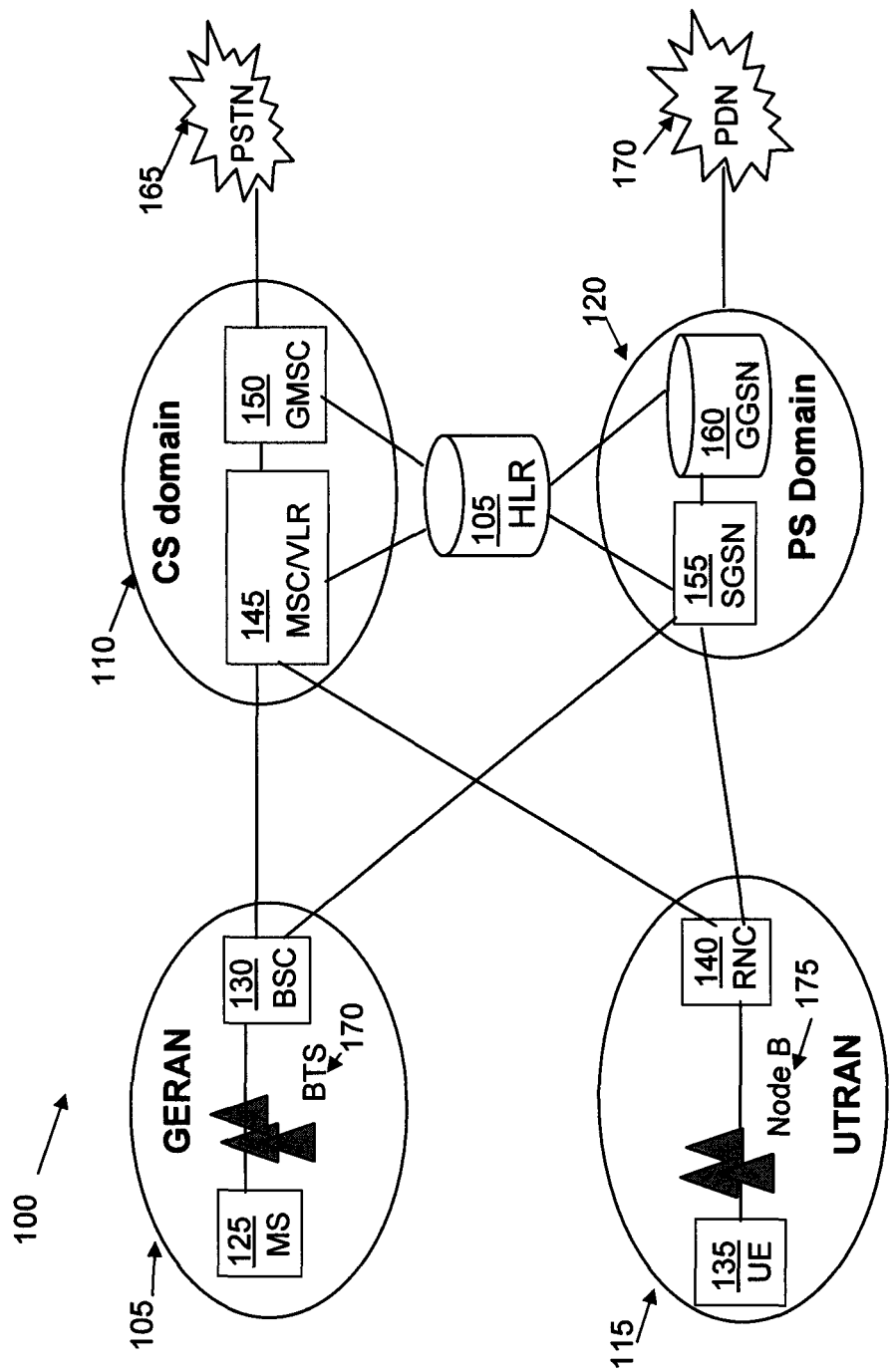
FIG. 1 is a schematic block diagram illustrating the components of a 3G network.

FIG. 1 is a schematic block diagram illustrating the components of a 3G network. FIG. 1 details a known Third Generation (3G) telecommunication network 100. 3G is a cellular network which provides for wide-area wireless voice services, simultaneous use of speech and data service and higher data rates, for example, using 3G, live television broadcasts can be viewed via a mobile phone. This is achieved through increased spectral efficiency. The components of the 3G telecommunication network 100 are explained in order to place example embodiments in context.

A 3G network comprises a number of subsystems 105, 110, 115, 120 which can interface and interact with each other in order to provide the benefits of some example embodiments, namely a circuit switching subsystem (CS domain) 110, a packet switching subsystem (PS domain) 120, a GSM Edge Radio Access Network (GERAN) 105 and a Terrestrial Radio Access Network (TERAN) 115. The CS subsystem 110 communicates with a packet switched network (PSTN) and the PS subsystem 120 communicates with a packet data network (PDN) 170.

The GERAN subsystem 105 comprises a GSM radio access network comprising of Base Station Controllers (BSCs) 130 and Base Transceiver Stations (BTS) 170. The radio access network 105 is responsible for processing network traffic between a mobile phone and the network switching subsystem 105. The radio access network subsystem 105 performs such functions as transcoding of speech channels, allocation of radio channels to mobile phones, paging, quality management of transmission etc.

The radio access network subsystem 105 comprises a number of cells. Each cell comprises equipment that is responsible for enabling wireless communication between mobiles phones (and like equipment) via the GSM telecommunication network 100. Each cell is responsible for a geographical area of coverage and comprises a base transceiver station (BTS) 170 for receiving and transmitting radio signals and means for encrypting and decrypting radio communications received by and transmitted to and by a mobile phone etc.

A cell is associated with a base station controller 130. The base station controller 130 receives data from a base transceiver station 170 (BTS) and is responsible for control functions and physical links between the network switching subsystem 110 and the base transceiver station (BTS) 170. The base station controller (BSC) 130 provides the functionality of a high capacity switch that provides functions such as communication handover, cell configuration and the control of radio frequency power levels in the base transceiver stations (BTS). The base transceiver station (BTS) is operable for communication with the network switching subsystem.

A UTRAN subsystem 115 is the equivalent of a UMTS radio access network that includes Radio Network Controller (RNC) 140 and Node Bs. A Node B is a logical network component which serves one or more UTRAN cells. A Node B 175 is also known as a femtocell. A Node B 175 is equivalent to a BTS 170 in a GSM network. A common packet domain Core Network is used for both GSM and UMTS networks. This common Core Network provides packet-switched (PS) services. The Serving GPRS Support Node (SGSN) 155 keeps track of the location of an individual MS 125 and performs security functions and access control.

In order to access PS services in the PS subsystem, an MS 125 shall first makes its presence known to the network by performing a GPRS attach. This makes the MS 125 available for SMS over PS, paging via the SGSN 155, and notification of incoming PS data.

In order to send and receive PS data, the MS 125 activates the Packet Data Protocol context that it wants to use. This operation makes the MS known in the corresponding GGSN 160, and interworking with external data networks can commence.

A Serving GPRS Support Node (SGSN) 155 is a node that is serving an MS 125. The SGSN 155 supports GPRS for GSM and/or UMTS. At PS attach, the SGSN establishes a mobility management context containing information pertaining to e.g., mobility and security for the MS 125. At PDP Context Activation, the SGSN 155 establishes a PDP context, to be used for routing purposes, with the GGSN 160 that the subscriber will be using.

The Gateway GPRS Support Node (GGSN) 160 is a node that is accessed by the packet data network due to evaluation of a PDP address. It contains routing information for PS-attached users. GGSN 160 functionality is common for GSM and UMTS.

A Radio Network Controller (RNC) 140 is a network component in the Public Land Mobile Network (PLMN) and provides the functions for control of one or more Node B's 175. An RNC (Radio Network Controller) is the equivalent of the BSC (Base Station Controller) in a GSM network. A Node B is a logical network component which serves one or more UTRAN cells.

A person skilled in the art will realize that there are many other aspects to a GSM telecommunication network 100—but the above description is only intended to be an introduction to the main components of a GSM telecommunication network 100.

Figure 2:
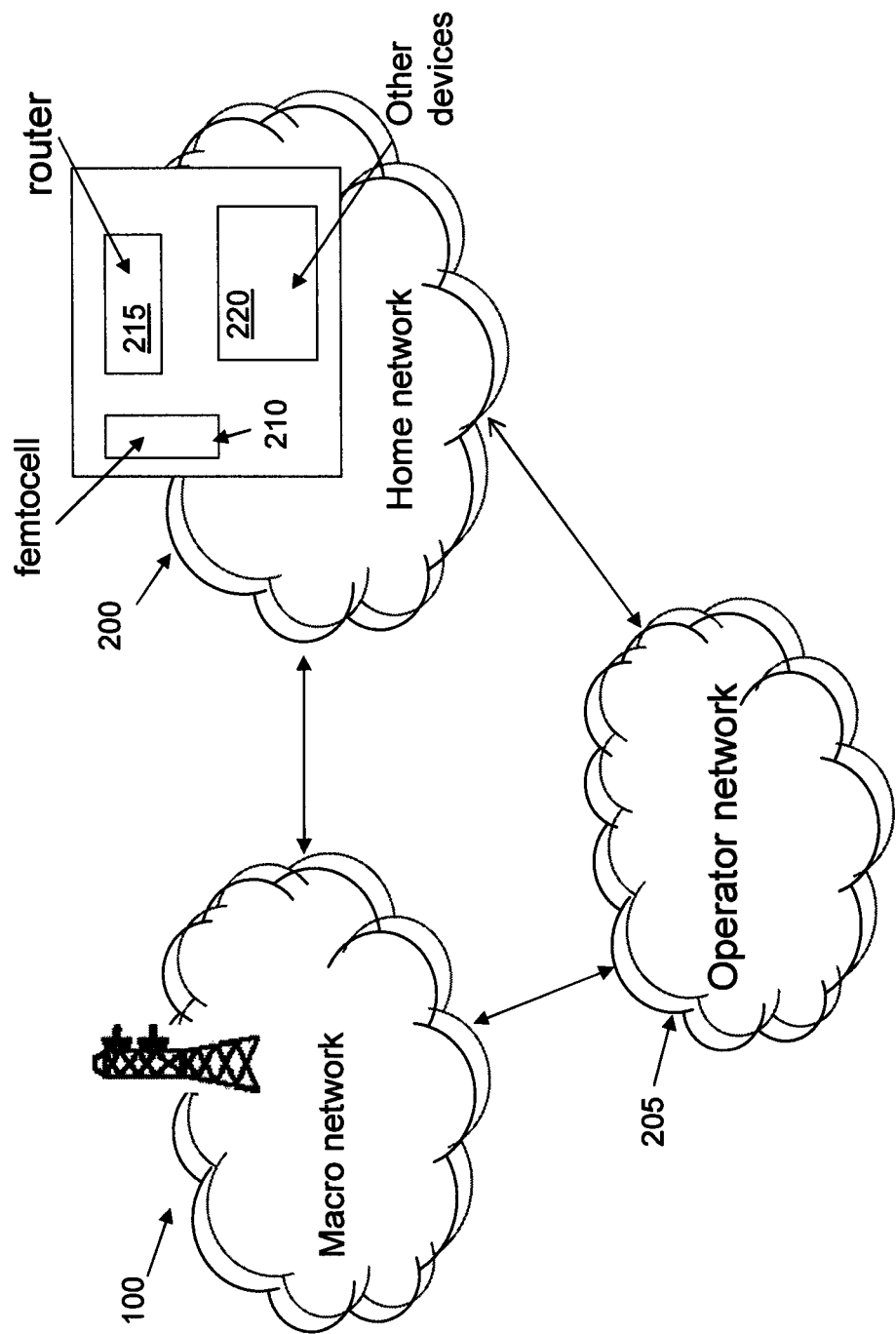
FIG. 2 is a block diagram illustrating a macro network, an operator's network and residential network.

FIG. 2 is a block diagram illustrating a macro network, an operator's network and residential network. In particular, FIG. 2 illustrates a high level diagram depicting a macro network which is typically known as the 3G telecommunication network of FIG. 1, i.e. the operator's network 205 i.e. a service provider's network, which provides many different types of services to their subscribers across the macro network and a subscriber's home or residential network 200.

Performance management systems are operable for use in the service provider's network. 205. A femtocell 210 is located in the residential premises and is typically connected to a subscriber's router 215. A femtocell 210 can be a low power wireless access point that provides localized 3G coverage. Radio signals inside a building are often weaker that outside because building construction or walls hinder the radio waves being transmitted to and from the base station. Femtocells 210 can improve coverage by connecting to a service provider's network using a typical broadband connection. A femtocell 210 creates a local mobile phone signal that allows connection with a 3G mobile phone and other wireless or Ethernet connected devices 220. Typically, several mobile devices are able to transmit data and calls through one femtocell simultaneously. The femtocell 210 may be part of a subscriber's broadband connection device or it may be a separate Ethernet or wirelessly connected device.

Figure 3:
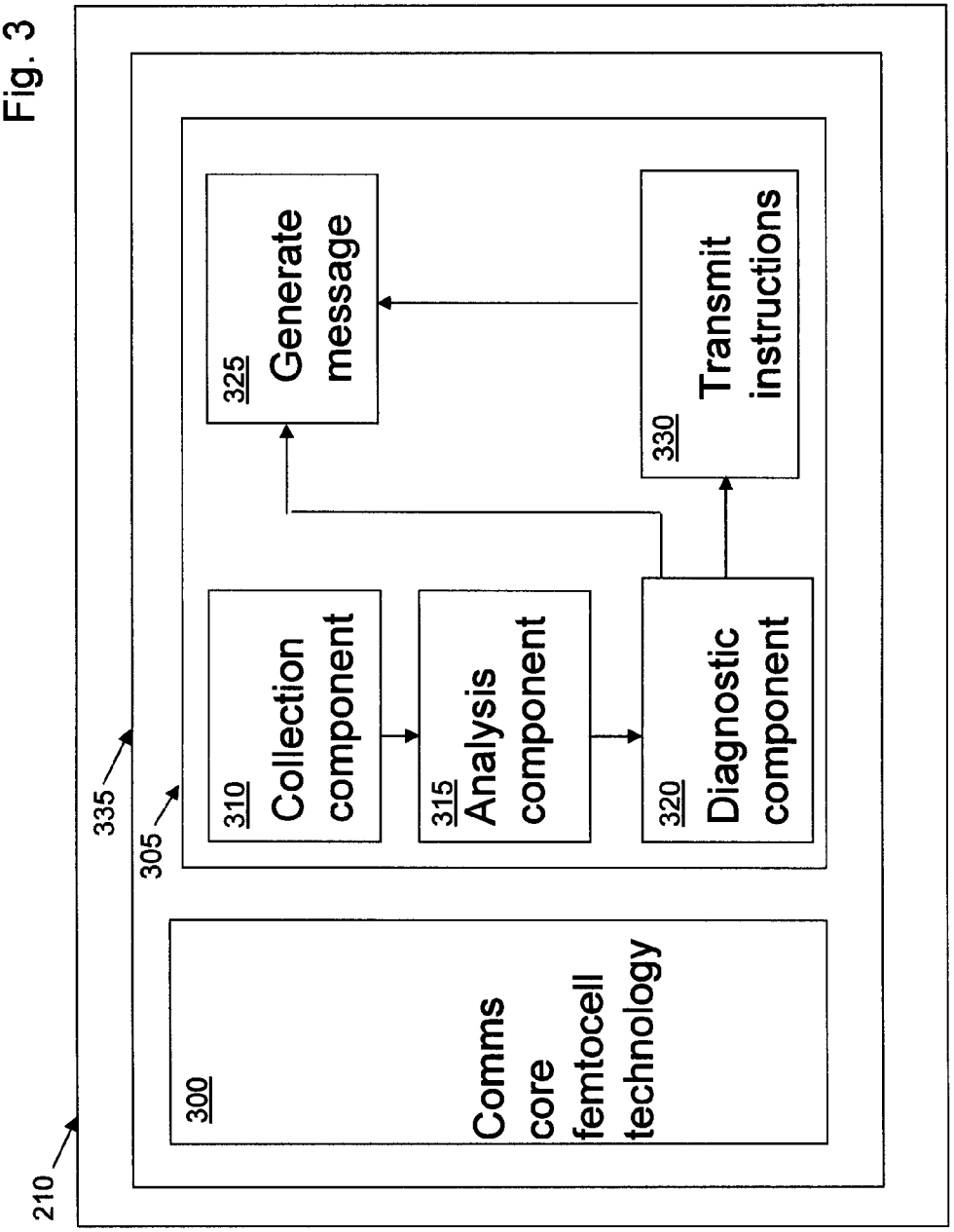
FIG. 3 is a block diagram illustrating the components of a monitoring system which cooperates with a femtocell, according to some example embodiments.

FIG. 3 is a block diagram illustrating the components of a monitoring system which cooperates with a femtocell, according to some example embodiments. In particular, FIG. 3 details a femtocell monitoring component 335 that is operable for use with a femtocell 210 and for communicating with a performance management system in the service provider's network 205.

The femtocell monitoring component 335 would typically be installed on the femtocell 210. However, a person skilled in the art would realize that other configurations of the monitoring component 335 are possible without departing from the scope of embodiments, such as, operable on the broadband router, mobile phone etc.

The monitoring component 335 comprises a collection component 310 for collecting data associated with the femtocell's environment 210, an analysis component 315 for analyzing the collected data and for interfacing with a diagnostic management component 320 in order to determine a corrective action to take place or other diagnostic routines that should be run in order to locate an identified fault, a transmit instruction component 330 for instigating an instruction recommended by the analysis component 315 and a message generation component 325 for generating a message requesting assistance from a higher order system, such as a performance management system operating within a service provider's network 205.

The collection component 310 collects data relating to its own environment, i.e., relating to the femtocell 210 environment. For example, data regarding network congestion, degradation, broadband/router performance, data regarding any other network connected device, quality of service statistics etc. The collection component 310 periodically 'pings' various connected devices for this information over a predefined period. A connected device can be a broadband router 215, a computer, a mobile phone, a smart metering device or any other network connected device 220.

The collection component 310 communicates the collected information to the analysis component 315 for analyzing. The analysis component 315 analyses the collected data to determine a 'fault type'. Identification of a 'fault type' allows for the diagnostic component 320 to perform a lookup in a database for solutions which could provide a 'fix' to the identified fault. Alternatively or in addition, the diagnostic component 320 can suggest and action other types of diagnostic routines that are required to be run in order to identify the fault. If the analysis component 315 determines that the collected data is indicating a certain type of fault or the diagnostic component 320 is unable to correct the fault—the diagnostic component 320 transmits an instruction to the generate message component 325 requesting that a message is generated and transmitted to the performance management (PM) system residing in the service provider's macro network. The diagnostic component 325 also gathers together the relevant information that the PM system will need to know in order for the PM system to perform additional diagnostic activities in order to identify and rectify the reported fault. For example, if the analysis component determines that there is a problem with interference between the femtocell 210 and a neighboring femtocell 210. The fault exhibited can be one of telecommunication calls being dropped because of a failure in a call setup.

Thus, at this point in time, the analysis component 315 does not know what is causing interference between the two femtocells 210. It can be that one or more neighboring femtocells 210 are causing the problem or it may be caused by some other wireless device 220. Thus, the analysis component 315 communicates with the diagnostic component 320 and a generate message component 325 in order to transmit a 'collect data' message to the PM system 400 in the operator's network 205 for further processing. The collect data message can also be a problem report. The report will send as much information as reasonable possible to the PM system in order for the PM system to be able to diagnose the fault. The PM system is a 'higher order' system and it can be because of the nature of the problem only certain diagnostic tests and fixes can be carried out by the PM system. This is because the PM system will have a 'view' of the network 100 and will be receiving reports from many other femtocells and using all of the received information is better placed to diagnose the problem. The problem report can additionally comprise all of the diagnostic tests and fixes that the femtocell has tried on order to rectify the problem.

Below are three examples of types of 'collect data' or problem report messages:

'Collect Data' Message Contents

Example 1

Interference Problem

ID of femtocell: AD9674321B

Type of Problem: Communications

Scope: Neighbours

Additional Information: A list of the current metrics related to interference, e.g. RF frequency, power control parameters, etc.

Figure 4:
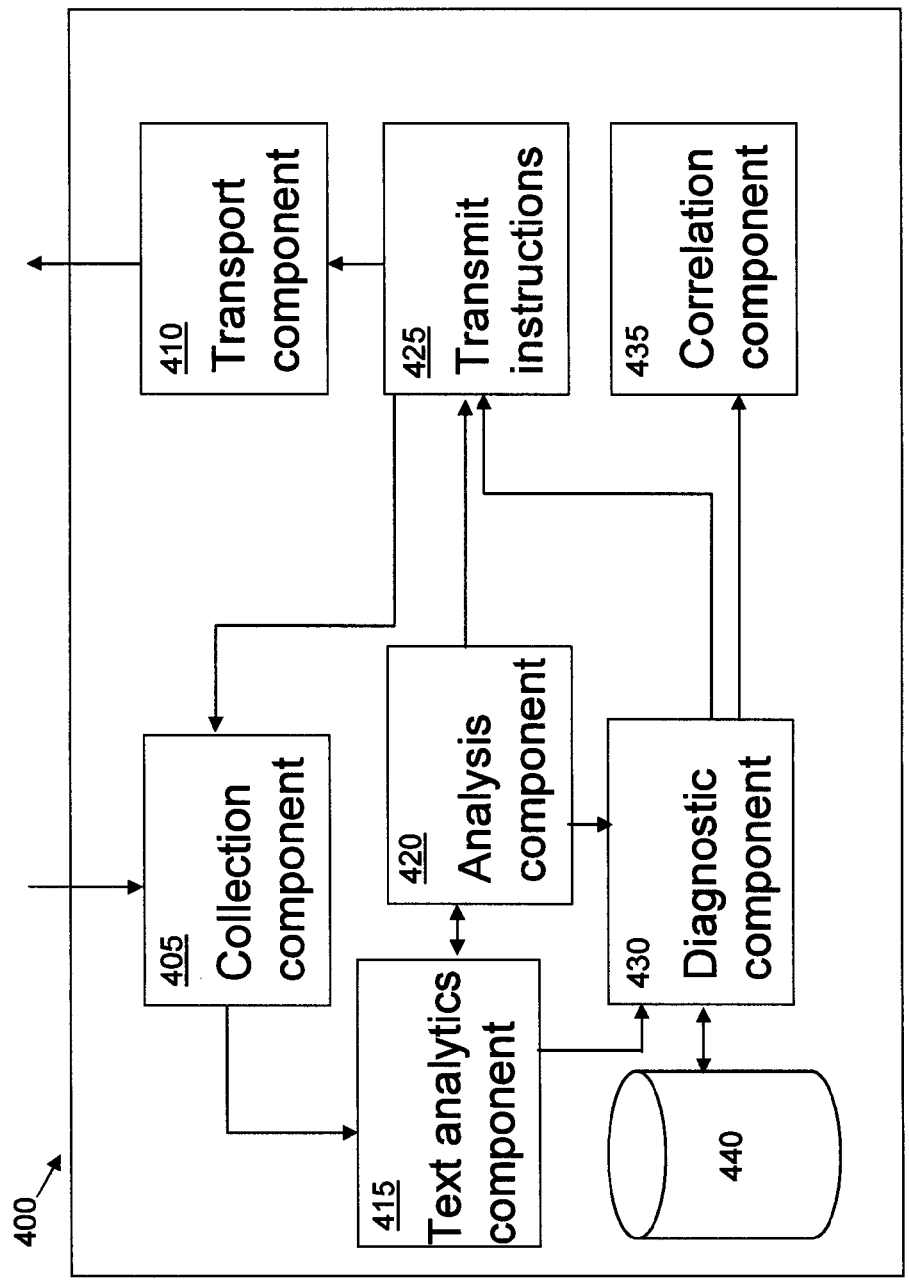
FIG. 4 is a block diagram illustrating the components of a performance management system which cooperates with a plurality of femtocells, according to some example embodiments.

FIG. 4 is a block diagram illustrating the components of a performance management system which cooperates with a plurality of femtocells, according to some example embodiments. In particular, the PM system 400 is operable within the operator's network 205 (and sits outside of the macro network 100) receives the 'collect data' message from the femtocell 210. The PM system 400 passes this information to a text analytics component 415 to parse the data within the received message. The text analytics component 415 cooperates with an analysis component 420 and a diagnostic component 430 in order for the analysis component 420 to determine a corrective action in response to the problem identified by the analysis component 420. The diagnostic component 430 and the analysis component 420 can determine the following corrective action to take place:

Corrective Action

Obtain a list of neighbours

Read the current settings of interference parameters in each femtocell identified in a neighbouring property Perform analysis and compute new interference parameters for both the original femtocell and the identified femtocells Modify current setting of parameters in each of those femtocells to the new computed femtocell parameters in order to correct interference problem Another example is as follows:

Example 2

Broadband Backhaul Problem

In this example, the analysis component 315 of the femtocell 210 detects that there is a network congestion problem in the broadband backhaul resulting in poor throughput through the broadband backhaul.

The generate message component 325 associated with the femtocell 210 generates a 'collect data' message comprising the following data:
ID of femtocell: AD 239549 DC
Type of Problem: Communications
Scope: Broadband Backhaul
Additional Information: A list of the current metrics related to throughput, e.g. data volume uplink, data volume downlink, number of PDP sessions. Broadband parameters, e.g. bandwidth.

The message is transmitted to the PM system 400 in the service provider's network 205. The PM system 400 passes this information to a text analytics component 415 to parse the data within the received message. The text analytics component 415 cooperates with a diagnostic component 430 and the analysis component 420 in order to determine a corrective action in response to the problem identified by the text analytics component 415. The diagnostic component 430 may determine the following corrective action to take place:
Corrective Action
  Run diagnostic tests in the broadband router to test the service
  Collect and analyse the diagnostic test results
  Determine an action such as, handover to the service provider's macro network

Example 3

Processing Failure Problem in the Femtocell

In this example, the analysis component 315 of the femtocell 210 detects that there is a process problem within its own system. The diagnostic component sends a communication to the generate a message component 325 to generate a 'collect data' message for transmitting to the PM system 400 in the service provider's network 205.

The following is an example, of the type of information that may be collected by the femtocell 210 and transmitted as part of the 'collect data' message.
ID of femtocell: AD 928473 DC
Type of problem: Processing failure
Scope: Femtocell
Additional information: Error log information of the last 'n' transactions The message is transmitted to the PM system 400 in the service provider's network 205. The PM system 400 passes this information to a text analytics component 415 to parse the data within the received message. The text analytics component 415 cooperates with a diagnostic component 430 and the analysis component 420 in order to determine a corrective action in response to the problem identified by the analysis component 420. The diagnostic component 430 can determine the following corrective action to take place:
Corrective Action
  Collect more specific metrics from the femtocell
  Based on analysis of the collected metrics, determine an appropriate action, such as downloading an upgrade of a new version of the femtocell operating software to the femtocell and rebooting the femtocell
  Re-collect metrics at a later time (possibly for a number of periods) to determine if the fault is resolved Thus, the PM system 400 resident in the service provider's network 205 receives messages from a plurality of monitoring components 335, wherein each of the plurality of monitoring components 335 are operating within its own femtocell 210 or associated with its own femtocell 210. The received message comprises information detailing an identifier which identifies a femtocell from another femtocell (each femtocell may be registered with the service provider before it is operational on the service provider's network) and information which allows the PM system to determine the type of fault perform further actions in order to resolve the problem. An action can comprise gathering further statistical information, performing further diagnostic procedures or applying a fix.

For example, if the received message identifies that there is an interference problem with neighboring femtocells 210, the analysis component 420 determines whether other messages containing problem reports have been received from the neighboring femtocells 210. If no problem reports have been received from other neighboring femtocells 210, the analysis component 420 instructs the instruction component 425 to send a message to each of the identified neighboring femtocells 210 to instruct each of the neighboring femtocells to collect statistical information pertaining to interference. Each of the neighboring femtocells 210 transmits the requested information back to the text analytic component 415 which parses the data in the message and communicates with the analysis component 420 of the PM system 400 for further processing. The analysis component 420 analyses each of the problem reports and in cooperation with a correlation component 435 determines which femtocell is causing the problem.

The correlation component 435 is used when there is conflicting information between a plurality of problem reports. For example, if the analysis component 420 receives four problem reports from four different femtocells 210 and in two of the reports the interference parameters indicate that it is femtocell 'A' causing the problem and two of the other problem reports indicate that it is femtocell 'B' causing the problem. The correlation component 435 analyses the information contained in the problem report to identify the more overriding evidence i.e. addition parameters that may indicate that a particular femtocell is causing the interference. On identifying the femtocell 210 causing the problem the correlation component 435 instructs the analysis component 420 to compute new setting parameters for the problem causing femtocell 210. The instruction component 425 sends the new setting configuration parameters via the transport component 410 to the identified femtocell 210. The PM system 400 can also selectively rank the received problem reports on an order of severity. Thus dealing with the most severe problems first.

A portable computing device 220 such as a mobile phone can also be used to send problem reports to the PM system in the macro network. When a subscriber, who subscribes to services provided by a mobile network service provider, is using their, for example, mobile phone, moves into an area of network coverage provided by their femtocell 210—a handover operation should take place between the 3G cell currently handling cell data and the femtocell. If this handover does not take place—then the subscriber will not be able to send and receive phone calls or use other data services provided by their service provider. Thus, in this situation, a mobile phone 220 can also comprise some diagnostic software in order to diagnose and correct the fault of the femtocell not responding. If the diagnostic software is unable to rectify the fault then the mobile device can transmit a message to the PM system in the macro network asking for assistance.

Figure 5:
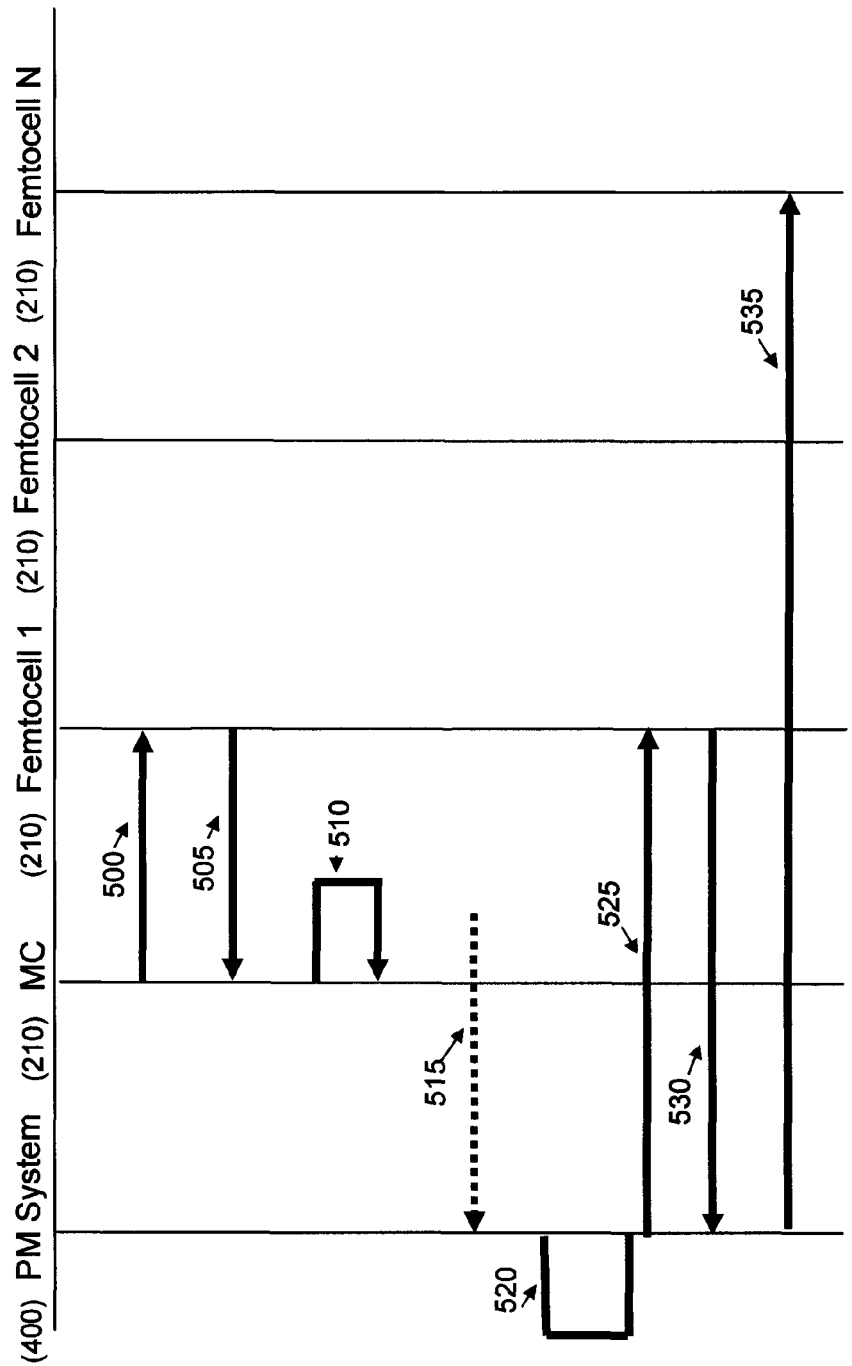
FIG. 5 is a swim diagram showing the process between a plurality of femtocells and a performance management system, according to some example embodiments.

FIG. 5 is a swim diagram showing the process between a plurality of femtocells and a performance management system, according to some example embodiments. At operation 500, the monitoring system 335 associated with a femtocell 210 periodically collects data from its own femtocell 210. The data comprises both performance and event data or any other statistical data that does not fall within either of the two former categories. At operation 505 and 510, the analysis component 315 and the diagnostic component 320 work together to analyze the performance and event parameters received from various entities operating within the femtocell's environment. The analysis component 315 and the diagnostic component 320 work through a process of analysis, and applying fixes in order to try and resolve a problem. A problem can be detected because of degradation in performance indicated by an operating performance parameter falling below a predetermined threshold.

If the monitoring component 300 is unable to resolve a detected problem, a problem report is transmitted to the PM system 400 requesting further assistance at operation 515. The PM system 400 receives the problem report from a femtocell 210. In practice the PM system 400 will receive thousands of problem reports from thousands of femtocell 210.

At operation 520, the PM system 400 is constantly receiving problem reports from a variety of femtocells registered within its network environment. The analysis component manages a list of all femtocells that the PM system is responsible for. As each problem report is received the collect component updates the list of femtocells 210 to collect data from and then proceeds to collect additional information associated with each one of these identified femtocells. Problem reports are stored in the data store 440.

The analysis component 420 in combination with the diagnostic component 430 then proceeds to analyze the additionally received information and determines a form of correct action to be taken, at operation 525.

At operation 525 to 535, the collection component 405 collects the requested information. In this example, it can be seen that the collection component 405 only collects from femtocell 1 and 3—but not femtocell 2. That is because in this example, femtocell 2 has not been identified for collection because no problem report has been received from femtocell 2.

The analysis component 420 in combination with the diagnostic component 430 then proceeds to analyze the additionally received information and determines a form of correct action to be taken. The entire process is an iterative process, involving the femtocell undertaking its own collection of data, analyzing and diagnosing faults and applying fixes. It is only when the femtocell has exhausted nearly all avenues that a message is transmitted to the PM system 400 to ask for further assistance. The PM system 400 is then able to identify which tests have been performed by the femtocell. Based on this information, the performance parameters and the event data, the PM system can determine which further tests to perform that the femtocell is unable to. Thus, the PM system 400 only receives reports from selected femtocell (i.e., femtocells experiencing problems).

Example embodiments can take the form of an entirely hardware embodiment, an entirely software embodiment or an embodiment containing both hardware and software elements. Some example embodiments can be implemented in software, which includes but is not limited to firmware, resident software, microcode, etc.

Some example embodiments can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of embodiments described herein.

The invention claimed is:

1. An apparatus operable for use with a performance management system linked to a telecommunication network, the apparatus comprising:
a collection component configured to receive a plurality of problem reports from a plurality of femtocells,
a text analytics component configured to parse the plurality of problem reports;
an analysis component configured to analyze the plurality of problem reports parsed by the text analytics component, wherein the analysis component is configured to determine that there is conflicting information among the plurality of problem reports relative to identification of which of the plurality of femtocells is producing a problem in the telecommunication network, wherein the problem is interference with one or more other neighboring femtocells in the telecommunications network;
a correlation component configured to receive the plurality of problem reports parsed by the text analytics component and configured to receive the conflicting information among the plurality of problem reports from the analysis component, the correlation component configured to resolve the conflicting information to identify a femtocell of the plurality of femtocells that is producing the problem in the telecommunication network, wherein the analysis component is configured to generate at least one new setting for a performance parameter for the femtocell identified as producing the problem in the telecommunication network;
a correction component configured to create a correction of the problem at the femtocell, wherein the corrective action is unable to be determined by the femtocell; and
an instruction component configured to transmit the at least one new setting for the performance parameter for the femtocell to the femtocell via a transport component for the correction of the problem at the femtocell,
wherein the collection component, the text analytics component, the analysis component, the correction component, and the instruction component are within a higher order system in the telecommunications network in comparison to the femtocell, wherein the collection component, the text analytics component, the analysis component, the correction component, and the instruction component are configured to operate for correction of the problem at the femtocell after the femtocell has collected, analyzed, and diagnosed faults and after the femtocell is unable to correct the problem to reduce the interference with the one or more other neighboring femtocells without intervention by the higher order system.

2. The apparatus of claim 1, wherein the performance parameter comprises at least one of data volume uplink, data volume downlink, and bandwidth.

3. The apparatus of claim 1, wherein the collection component is configured to receive a problem report of the plurality of problem reports in response to detection of a processing failure in the femtocell by the femtocell.

4. The apparatus of claim 1, wherein the instruction component is configured to download an upgrade of operating software on the femtocell to the femtocell.

5. A computer program product for managing a performance management system linked to a telecommunication network, the computer program product comprising:
   a non-transitory computer readable storage medium having computer readable program code embodied therewith, the computer readable program code configured to,
   perform the following operations for correction of a problem at a femtocell of a plurality of femtocells that are communicatively coupled to the telecommunication network, wherein the problem is interference with one or more other neighboring femtocells in the telecommunications network, wherein the computer readable program code configured to perform is executed at a higher order system in the telecommunication network in comparison to the femtocell, and wherein the operations are executed at the higher order system after the femtocell has collected, analyzed, and diagnosed faults and after the femtocell is unable to correct the problem to reduce the interference with the one or more other neighboring femtocells without intervention by the higher order system, the following operations comprising computer readable program code configured to:
   receive a problem report from a femtocell of a plurality of femtocells communicatively coupled to the telecommunication network, the femtocell configured to provide communications from at least one mobile device to the telecommunication network through a broadband connection, wherein the problem report identifies a fault being exhibited by a femtocell and a performance parameter identifying a degradation in the performance of the femtocell;
   analyze the performance parameter for determining a corrective action to be performed in an environment linked to the femtocell, wherein the analyzing of the performance parameter is performable at the higher order system, wherein the analyzing of the performance parameter is unable to be performed at the femtocell; and
   perform the corrective action in the environment linked to the femtocell for correction of the problem at the femtocell, wherein the corrective action is performable at the higher order system, and wherein the corrective action is unable to be performed at the femtocell.

6. The computer program product of claim 5, wherein the performance parameter comprises at least one of data volume uplink, data volume downlink, and bandwidth.

7. The computer program product of claim 5, wherein the problem report is received is in response to detection of a processing failure in the femtocell by the femtocell.

8. The computer program product of claim 5, wherein the corrective action comprises a download of an upgrade of operating software on the femtocell to the femtocell.

9. The computer program product of claim 5, wherein the corrective action comprises collection, from the femtocell, metrics that are more specific than provided by the performance parameter in the problem report.

10. A computer program product for managing a performance management system linked to a telecommunication network, the computer program product comprising:
    a non-transitory computer readable storage medium having computer readable program code embodied therewith, the computer readable program code configured to,
    perform the following operations for correction of a problem at a femtocell of a plurality of femtocells that are communicatively coupled to the telecommunication network, wherein the problem is interference with one or more other neighboring femtocells in the telecommunications network, wherein the computer readable program code is configured to perform at a higher order system in the telecommunication network in comparison to the femtocell, and wherein the operations are executed at the higher order system after the femtocell has collected, analyzed, and diagnosed faults and after the femtocell is unable to correct the problem to reduce the interference with the one or more other neighboring femtocells without intervention by the higher order system, the following operations comprising computer readable program code configured to:
    receive a plurality of problem reports from a plurality of femtocells that are communicatively coupled to the telecommunication network, wherein the plurality of problem reports identify a performance parameter identifying a degradation in the performance of the at least one of the plurality of femtocells;
    analyze each of the problem reports and determining from which of the plurality of femtocells that the problems are being received from, wherein the analysis is performable at the higher order system, wherein the analysis is unable to be performed at the femtocell;
    identify a conflict between at least some of the plurality of problem reports based on analysis of the performance parameter;
    resolve the conflict based on at least one other performance parameter to identify a femtocell of the plurality of femtocells causing the degradation in the performance; and
    perform a corrective action on the femtocell for correction of the problem at the femtocell, wherein the corrective action is performable at the higher order system, and wherein the corrective action is unable to be performed at the femtocell.

11. The computer program product of claim 10, wherein the performance parameter comprises at least one of data volume uplink, data volume downlink, and bandwidth.

12. The computer program product of claim 10, wherein the problem report is received is in response to detection of a processing failure in the femtocell by the femtocell.

13. The computer program product of claim 10, wherein the corrective action comprises a download of an upgrade of operating software on the femtocell to the femtocell.

14. The apparatus of claim 1, wherein the analysis component, the correction component, and the instruction component are configured to operate for correction of the problem at the femtocell based on an initiation by a monitoring system executing at the femtocell.

15. The computer program product of claim 5, wherein the computer readable program code configured to perform the following operations for correction of the problem at the femtocell is initiated by a monitoring system executing at the femtocell.

16. The computer program product of claim 10, wherein the computer readable program code configured to perform the following operations for correction of the problem at the femtocell is initiated by a monitoring system executing at the femtocell.

17. The apparatus of claim 14, wherein as part of correction of the problem at the femtocell, the correction component is configured to:
   obtain a list of the other neighboring femtocells;
   read current settings of interference parameters of the one or more other neighboring femtocells and the femtocell;
   perform an analysis of the current settings of interference parameters of the one or more other neighboring femtocells and the femtocell;
   compute new interference parameters for the one or more other neighboring femtocells and the femtocell; and
   change the current setting of interference parameters to the new interference parameters for the one or more other neighboring femtocells and the femtocell.

18. The computer program product of claim 15, wherein as part of performance of the corrective action, the computer readable program code is configured to,
   obtain a list of the other neighboring femtocells;
   read current settings of interference parameters of the one or more other neighboring femtocells and the femtocell;
   perform an analysis of the current settings of interference parameters of the one or more other neighboring femtocells and the femtocell;
   compute new interference parameters for the one or more other neighboring femtocells and the femtocell; and
   change the current setting of interference parameters to the new interference parameters for the one or more other neighboring femtocells and the femtocell.

19. The computer program product of claim 16, wherein as part of performance of the corrective action, the computer readable program code is configured to,
   obtain a list of the other neighboring femtocells;
   read current settings of interference parameters of the one or more other neighboring femtocells and the femtocell;
   perform an analysis of the current settings of interference parameters of the one or more other neighboring femtocells and the femtocell;
   compute new interference parameters for the one or more other neighboring femtocells and the femtocell; and
   change the current setting of interference parameters to the new interference parameters for the one or more other neighboring femtocells and the femtocell.

* * * * *